(12) United States Patent
Dubois et al.

(10) Patent No.: US 12,015,644 B2
(45) Date of Patent: Jun. 18, 2024

(54) SYSTEM AND METHOD FOR UTILIZATION OF THREAT DATA FOR NETWORK SECURITY

(71) Applicant: Level 3 Communications, LLC, Broomfield, CO (US)

(72) Inventors: David Dubois, Erie, CO (US); Michael Benjamin, Broomfield, CO (US); Mark Dehus, Thornton, CO (US); Peter Brecl, Highlands Ranch, CO (US)

(73) Assignee: Level 3 Communications, LLC, Denver, CO (US)

( * ) Notice: Subject to any disclaimer, the term of this patent is extended or adjusted under 35 U.S.C. 154(b) by 350 days.

(21) Appl. No.: 16/845,799

(22) Filed: Apr. 10, 2020

(65) Prior Publication Data

US 2020/0329072 A1    Oct. 15, 2020

Related U.S. Application Data

(60) Provisional application No. 62/979,378, filed on Feb. 20, 2020, provisional application No. 62/979,376, filed on Feb. 20, 2020, provisional application No. 62/832,773, filed on Apr. 11, 2019.

(51) Int. Cl.
*H04L 9/40* (2022.01)
*G08B 21/18* (2006.01)

(52) U.S. Cl.
CPC .............. *H04L 63/20* (2013.01); *G08B 21/18* (2013.01); *H04L 63/0263* (2013.01); *H04L 63/102* (2013.01); *H04L 63/1416* (2013.01); *H04L 63/1433* (2013.01)

(58) Field of Classification Search
CPC ..... H04L 63/20; H04L 63/263; H04L 63/102; H04L 63/1416; H04L 63/1433; G08B 21/18
USPC ........................................................ 726/22
See application file for complete search history.

(56) References Cited

U.S. PATENT DOCUMENTS

| | | | |
|---|---|---|---|
| 10,673,870 B2 * | 6/2020 | Pierce ............... | H04L 63/1416 |
| 10,904,277 B1 * | 1/2021 | Sharifi Mehr ...... | H04L 63/1425 |
| 2006/0253389 A1 * | 11/2006 | Hagale ............... | G06Q 20/204 |
| | | | 705/64 |
| 2008/0162646 A1 * | 7/2008 | Pizano ............... | H04L 51/212 |
| | | | 726/4 |
| 2009/0177514 A1 * | 7/2009 | Hudis ................ | G06F 21/629 |
| | | | 707/E17.014 |

(Continued)

*Primary Examiner* — Dant B Shaifer Harriman

(57) ABSTRACT

Aspects of the present disclosure involve utilizing network threat information to manage one or more security devices or policies of a communication network. The security system may receive threat intelligence data or information associated with potential threats to a communications network and process the threat intelligence data to determine one or more configurations to apply to security devices of a network. The system may then generate a rule or action to respond to the identified attack, such as a firewall rule for a firewall device to block traffic from the source of the attack. The threat intelligence information may include a confidence score indicating a calculated confidence in the identification of the malicious communications, which may be utilized by the system to determine the type of action taken on the security devices of the network in response to the information or data.

15 Claims, 10 Drawing Sheets

(56) References Cited

U.S. PATENT DOCUMENTS

| | | | |
|---|---|---|---|
| 2015/0172323 A1* | 6/2015 | Pearcy | H04L 41/00 |
| | | | 726/22 |
| 2016/0127417 A1* | 5/2016 | Janssen | H04L 63/1433 |
| | | | 726/1 |
| 2017/0171235 A1* | 6/2017 | Mulchandani | G06F 21/554 |
| 2018/0219879 A1* | 8/2018 | Pierce | H04L 41/142 |
| 2019/0052664 A1* | 2/2019 | Kibler | G06F 11/301 |
| 2019/0089727 A1* | 3/2019 | Mulchandani | H04L 63/1441 |
| 2019/0207968 A1* | 7/2019 | Heckman | H04L 63/1433 |
| 2022/0060474 A1* | 2/2022 | Trentini | H04L 63/0876 |

\* cited by examiner

SYSTEM AND METHOD FOR UTILIZATION OF THREAT DATA FOR NETWORK SECURITY

CROSS-REFERENCE TO RELATED APPLICATION

This application is related to and claims priority under 35 U.S.C. § 119(e) from U.S. Patent Application No. 62/832,773, filed Apr. 11, 2019 entitled "SYSTEM AND METHOD FOR UTILIZATION OF THREAT DATA FOR NETWORK SECURITY," from U.S. Patent Application No. 62/979,376, filed Feb. 20, 2020 entitled "SYSTEM AND METHOD FOR UTILIZATION OF THREAT DATA FOR NETWORK SECURITY," and from U.S. Patent Application No. 62/979,378, filed Feb. 20, 2020 entitled "SYSTEM AND METHOD FOR UTILIZATION OF THREAT DATA FOR NETWORK SECURITY," the entire contents of all of which is incorporated herein by reference for all purposes.

TECHNICAL FIELD

Embodiments of the present invention generally relate to systems and methods for implementing a communications network, and more specifically for utilizing threat data or information to configure components of the network against network attacks.

BACKGROUND

Providing secure communications between devices is an important component of many communication networks. Such networks may therefore include one or more devices to provide security to devices within the network and/or devices utilizing the network to communicate. For example, many networks include a firewall device to control or monitor incoming and outgoing traffic to/from a network or network device. Firewall devices are typically dispersed at entry points into/out of a network such that potentially harmful or malicious communications can be detected and, in some instances, discarded or blocked by the firewall. Devices within the network may also include such protection schemes to prevent harmful communications from being processed by the devices. The primary purpose of a firewall is to act as the first line of defense against malicious and unauthorized traffic from affecting a network or device, keeping the information that an organization does not want out, while allowing APPROVED access to flow into and out of the network or device. Other security devices or systems may respond to denial-of-service attacks, phishing schemes to obtain sensitive information, malware distribution in or on the network, and the like. Through the collection of security procedures and devices, a network may be situated to respond to attacks and protect the communications within and transmitted through/from the network.

Network engineers may establish and implement one or more policies for the security devices of the network that define the security protocols executed by the devices. While a static security policy may somewhat protect a network, a security policy with the ability to adapt to the ever-changing environment of a network allows the security devices to combat new types and versions of attacks. However, as new attacks are discovered and new rules for addressing or handling those new attacks are added to a security policy, management of security devices may quickly become overwhelming for network managers or engineers. For example, many firewall devices today include rule-sets with thousands of rules that continually grow as more and more threats to the network are identified. Moreover, in a network environment, rules may be unique to domains, traffic types, customers, and other factors. Manually configuring the security devices and policies of a network with the newly identified attacks (as well as managing outdated security information) may consume both time and network resources. Further, some network engineers may not have access to all security devices used to protect a network. For example, a network may deploy security devices within the network, but may purchase one or more security services offered by connecting networks as part of the network security. Engineers of the network may thus not have direct access to the devices of neighboring networks such that updating or ingesting new security information to all aspects of a network's security may not be possible for some network configurations.

It is with these observations in mind, among others, that aspects of the present disclosure were conceived.

SUMMARY

One aspect of the present disclosure relates to a method for providing security services from a telecommunications network. The method may include generating, at a computing device, a security infrastructure profile comprising a first network security device of a first network and a second network security device of a second network, receiving, at the computing device, threat intelligence data comprising identification of a source computing device associated with a network threat and a risk score associated with communications originating from the source computing device, and transmitting, based on a comparison of the risk score of the threat intelligence data to a risk threshold value of a security trigger, information to configure the first network security device of the first network and the second network security device of the second network to apply a security policy to communications originating from the source computing device associated with the network threat.

Another aspect of the present disclosure relates to a network device comprising a processing device, a communication port receiving threat intelligence data comprising identification of a source computing device associated with a threat to a network and a risk score associated with communications originating from the source computing device, and a non-transitory computer-readable medium encoded with instructions. The instructions, when executed, cause the processing device to perform the operations of generating a security infrastructure profile comprising a first network security device of a first network and a second network security device of a second network and transmitting, based on a comparison of the risk score of the threat intelligence data to a risk threshold value of a security trigger of a security policy for the first network security device, information to configure the first network security device of the first network and the second network security device of the second network to apply a security action on communications originating from the source computing device associated with the threat to the network.

Yet another aspect of the present disclosure relates to a network security system comprising a first plurality of network security devices of the first network and a second plurality of network security devices of the second network and a network security management device in communication with the first plurality of network security devices of the first network and a second plurality of network security devices of the second network. The network security management device may include a processing device and a non-transitory computer-readable medium encoded with instructions. When executed, the instructions may cause the processing device to perform the operations of associating a security policy with a security infrastructure profile comprising the first plurality of network security devices of the first network and a second plurality of network security devices of the second network, the security policy comprising a security trigger parameter, receiving threat intelligence data comprising identification of a source computing device associated with a network threat and a risk score associated with communications originating from the source computing device, and transmitting, based on a comparison of the risk score of the threat intelligence data to a risk threshold value of the security trigger parameter, information to configure at least a first network security device of the first network to apply a security action on communications originating from the source computing device associated with the threat to the network.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

DETAILED DESCRIPTION

Figure 1:
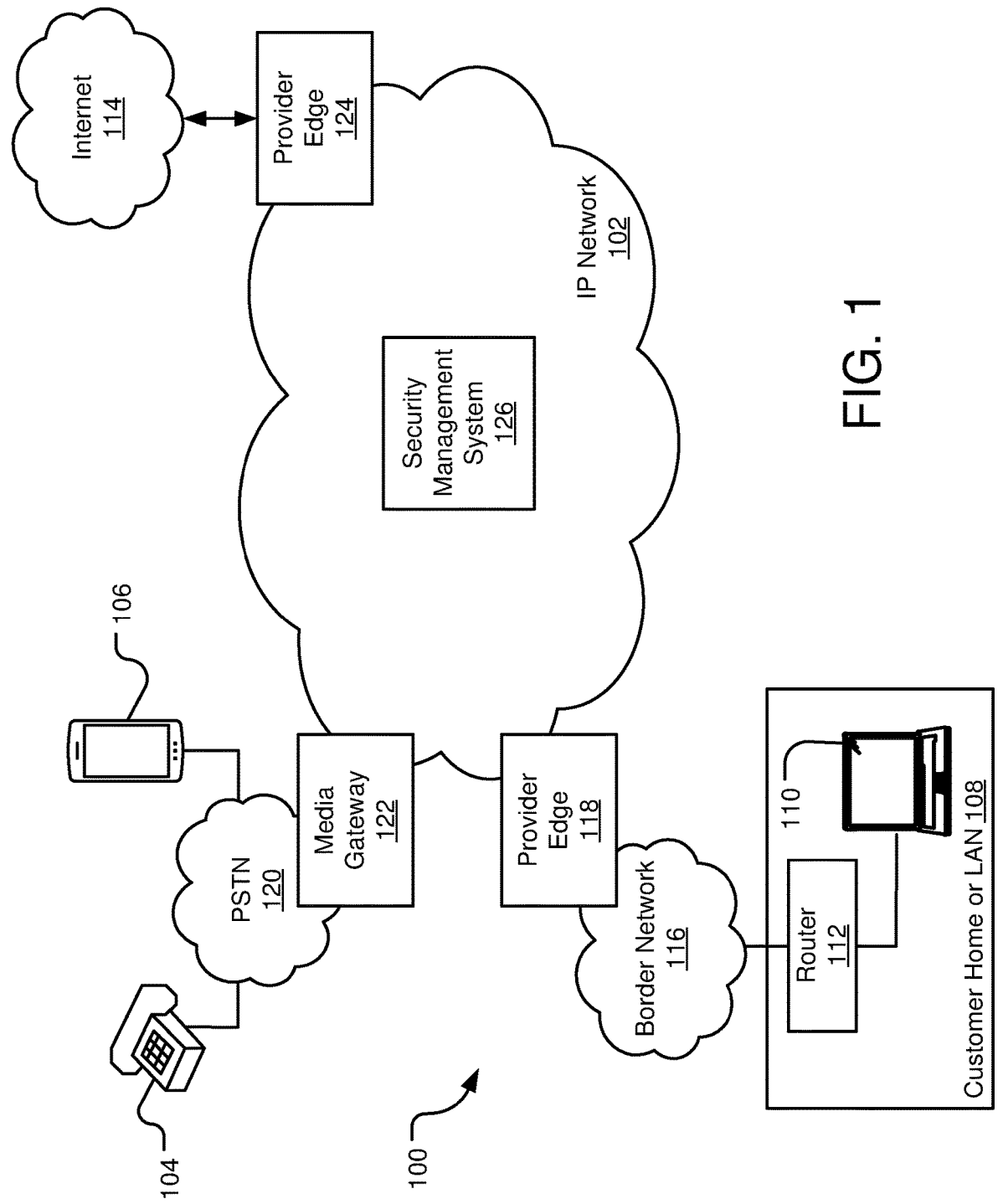
FIG. 1 schematic diagram illustrating an exemplary Internet Protocol (IP) operating environment in accordance with one embodiment.

Aspects of the present disclosure involve systems, methods, and the like, for utilizing network threat information to manage one or more security devices or policies of a communication network. The security system of the network may receive threat intelligence data or information associated with potential threats to a communications network and utilize the threat intelligence data for configuring one or more security systems, devices, or policies of the network in response to the received data. For example, the threat intelligence data may include source or destination Internet Protocol (IP) addresses associated with packets known or suspected to be malicious or part of an attack on the network. Other threat intelligence data may include domain name information associated with a security threat, malware-related packets or device information, information associated with computing viruses, and the like. The system may process the threat intelligence data to determine one or more configurations or policies to apply to security devices of a network based on the threat intelligence data. For example, the system may identify a source identifier (e.g., a source IP address), a file, a request, a communication, a destination identifier (e.g., a destination IP address), a domain or portion of a domain or domains, a series of communications, etc. that relate or form a part of an attack on a device or devices of the network. The system may then automatically generate a rule or action to respond to the identified attack, such as a firewall rule for a firewall device to block traffic from the source of the attack. In another example, the system may block a request to a domain name server (DNS) for an IP address in response to the threat intelligence data. In general, any rule or instruction to configure a security device of a network may be automatically generated by the system in response to the threat intelligence information or data obtained from the network. In one particular implementation, the threat intelligence information may include a confidence score indicating a calculated confidence in the identification of the malicious communications, which may be utilized by the system to determine the type of action taken on the security devices of the network in response to the information or data.

In some implementations, the system may transmit one or more instructions or otherwise communicate with devices of one or more networks to implement the security actions within the networks. For example, the system may generate a configuration instruction to a firewall device of the network or a firewall component of a network device to install or add a new firewall rule at the device in response to the processing of the threat intelligence information. In addition, the system may communicate with one or more other networks or devices, such as a neighboring network, a customer network, an Internet Service Provider (ISP) network, etc. associated with the backbone network to configure one or more security devices or services of the one or more other networks. For example, the system may configure a firewall device, anti-virus program, malware sandbox, etc. of a neighboring network based on the threat intelligence data or information. In this manner, the networks may be updated by the security system based on the threat intelligence information without the need of a network engineer to log into and configure/update network devices manually.

The security system described above may also receive information from a customer or user of the system to customize the system response to the security threat information. For example, one or more sub-systems of a security infrastructure associated with a customer of the system may be defined. Sub-systems may include any type and number of devices of the security infrastructure associated with the user, including devices of separate networks, devices located in separate geographical areas, devices of differing or the same security functions, etc. Each of the sub-systems may have a different security policy established for responding to the threat intelligence information. For example, a sub-system of firewall devices of the user's security infrastructure may have a first associated security policy or actions for application in response to threat information, while a second sub-system of security devices located within a geographic area may have a second associated security policy for application in response to the threat information. Further, a trigger including risk score, category of threat, type of threat indicator, etc. may be associated with one or more of the sub-systems or the global security system of the user. In this manner, the response to threat intelligence information may be configured or customized for users of the system based on the information received by the system.

In some embodiments, the system may also receive event logs from one or more of the security devices of the security infrastructure of a customer's network or other networks. The system may analyze or process the event logs from the devices and compare the event logs to the threat intelligence information. Circumstances in which one or more of the events of the security devices matches a potential threat to the network as indicated in the threat intelligence information may cause the system to configure or otherwise respond to the matched event to the potential security threat. Further, the threshold for implementing a response to a matched event to a threat may be different than a threshold for configuring a security device in response to general threat information. For example, the security infrastructure may be altered or configured in response to threats that exceed a first threshold confidence score of the threat. Threat information that matches an event log of a security device of the infrastructure, however, may initiate a response even if the confidence score of the threat is less than the first threshold value. Rather, a lower confidence threat score may be associated with matched event/threats for implementation by the system to the security infrastructure. The security system of the network may thus implement and configure security devices/procedures in response to threat intelligence information or data to protect the network from potential security risks.

Although discussed herein as related to network security, the systems and methods describe may similarly be applied at host level security controls. For example, the systems and methods described herein may apply to individual network or other security devices to utilize threat intelligence data to adjust security policies associated with those devices. Changes to security policies may be applied by a separate or integrated security platform as described herein.

FIG. 1 illustrates an exemplary operating environment 100 for providing security procedures in one or more networks, including an IP network 102, border network 116, a customer network, etc. In general, the environment 100 provides for establishing communication sessions between network users and for providing one or more network services to network users. For example, users may utilize the network 102 to communicate via the network using communication devices, such as telephone devices 104 and/or mobile communication devices 106. In another example, content from a content delivery network (CDN) may be provided to and/or from one or more customers of the network 102 through the operating environment 100 discussed herein. In still another example, the network environment 100 may facilitate communications between networks managed or administered by separate entities, such as communications between IP network 102 and border network 116. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. Communications between the IP network 102 and other entities or networks, such as the one or more customer home or business local area networks (LANs) 108, may also be managed through network environment 100. Some implementations of the IP network 102 may include a security management system 126. The security management system 126 may provide a customer to the IP network 102 control over one or more security devices of the network 102 or a network connected to the IP network, such as border network 116. The security management system 126 may also provide one or more security services to the connected network 116 or customer of the network, such as a firewall function, malware sandbox, anti-virus protection, etc. The procedures and operations of the security management system 126 are described in more detail below.

Customer network 108 can include communication devices such as, but not limited to, a personal computer or a telephone 110 connected to a router/firewall 112. Although shown in FIG. 1 as computer 110, the communication devices may include any type of communication device that receives a multimedia signal, such as an audio, video or web-based signal, and presents that signal for use by a user of the communication device. The communication and networking components of the customer network 108 enable a user at the customer network to communicate via the IP network 102 to other communication devices, such as another customer network and/or the Internet 114. Components of the customer network 108 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 108 typically connects to the IP network 102 via a border network 116, such as one provided by an Internet Service Provider (ISP). The border network 116 is typically provided and maintained by a business or organization such as a local telephone company or cable company. The border network 116, also referred to as a peer network, may provide network/communication-related services to their customers. Other communication devices, such as telephonic device 104 and/or mobile device 106, may access and/or be accessed by, the IP network 102 via a public switched telephone network (PSTN) 120 operated by a local exchange carrier (LEC). Communication via any of the networks can be wired, wireless, or any combination thereof. The telephonic device 104, mobile device 106, and/or computing device 110 may further utilize the IP network 102 to communicate with or otherwise access the Internet 114 to provide and obtain data.

Networks, such as the Internet 114, border network 116, and/or PSTN 120, may connect to IP network 102 through one or more interface devices. Interface devices may include, but are not limited to, provider edge devices 118 and 124 and/or provider media gateway device 122. For ease of instruction, only three external networks 114, 116, and 120 are shown communicating with the IP network 102; however, numerous such networks, and other devices, may be connected with the network 102, which is equipped to handle enormous numbers of simultaneous calls and/or other IP-based communications.

The telecommunications network 102 may provide an interface to a customer or border network 116, 120 to connect to the network through a provider edge 118, 124 or media gateway 122. In some instances, a border network 116 may be managed by a customer to the IP network 102 such that communications transmitted from and intended for the customer network or border network 116 may be provided via the IP network. The IP network 102 may also provide one or more telecommunication or other network services to the customer or border network 116. For example, the customer may purchase, and the IP network 102 may provide, one or more security services for protection of the communications provided to and transmitted from the border network 116. Such security services may be provided via the provider edge 118 of the network 102 or any other device of the network, as explained in more detail below.

Figure 2:
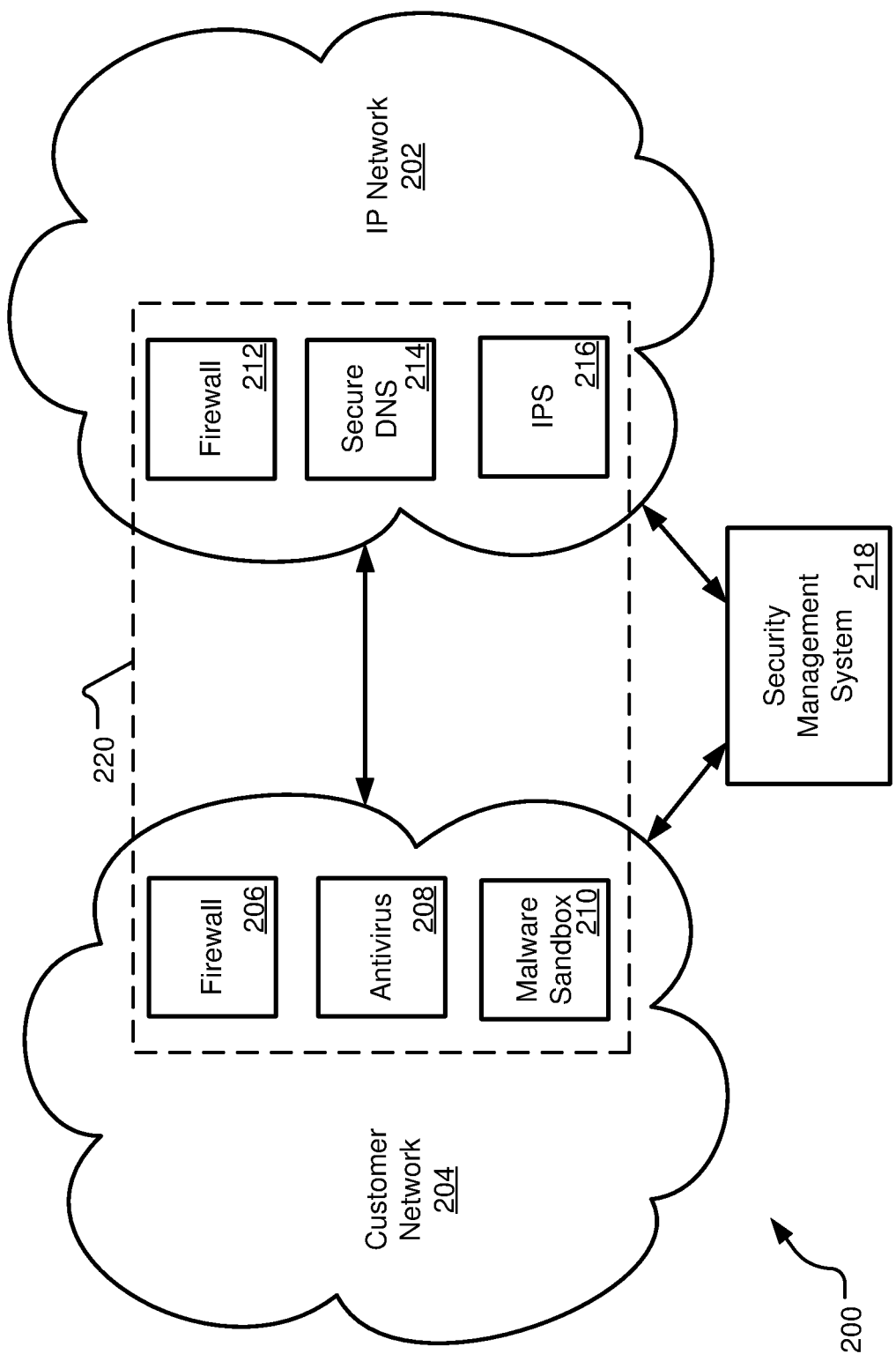
FIG. 2 is a schematic diagram illustrating a network environment for security management of networking devices of a customer network and an IP network in accordance with one embodiment.

FIG. 2 is a schematic diagram illustrating a network environment 200 for security management of networking devices or policies of a customer network 204 and an IP network 202. The environment 200 includes an IP network 202 similar to the IP network discussed above. The IP network 202 may provide one or more security services to customers of the network. For example, customer network 204 may be in communication with the IP network 202 for receiving and transmitting communications to/from the customer network. An administrator of the customer network 204 may purchase or otherwise agree with the IP network 202 to receive one or more of the security services provided by the IP network. Customer network 204 may be similar to the border network 116 discussed above, but may also be any type of network, device, group of devices, virtual network, etc. in communication with the IP network 202. As discussed above, customer network 204 may connect to IP network 202 through a provider edge device. However, it should be appreciated that the customer network 204 may connect to IP network 202 through any number of connections in any number of locations.

As illustrated in FIG. 2, the IP network 202 may provide security services 212-216 to the customer network 204 (and other customers of the network 102). For example, the IP network 202 may provide a firewall service 212 or device to the customer network 204. In general, the firewall service 212 provides gatekeeping functions for communications into or out of the customer network 204. In one example, the firewall service 212 may be included in the provide edge device of the IP network 102 that receives communications associated with the customer network 204. In another example, the firewall service 212 may be implemented by a firewall device or firewall server of the IP network 202. The firewall service 212 may block, re-route, deny, flag, etc. communications entering or leaving the customer network 204 based on a set of firewall rules. Management and configuration of the firewall rules of the firewall service 212 is discussed in more detail below.

The IP network 202 may also provide other security services to the customer network 204. For example, the IP network 202 may provide a secure Domain Name System (DNS) to the customer network 204. The secure DNS service 214 may operate as a typical DNS device by receiving requests for IP addresses associated with a domain name. The secure DNS service 214, however, may provide security in the response to the DNS request by blocking the return of IP addresses for particular domain names, responding with a security alert for particular domain names, redirecting devices to an IP address for domain names, and the like. Another security service provided by the IP network 202 may be an intrusion prevention system (IPS) service 216. The IPS service 216 may include a combination of security features provided as a package of services offered by the IP network 202, including firewall protection and/or secure DNS services. In general, the IP network 202 may provide any number and types of security services to customers of the network.

The customer network 204 may also include security features implemented by the customer network. For example, the customer network 204 may instantiate a firewall security feature 206 in a firewall device or application server of the customer network. An anti-virus security feature 208 may also be included in the customer network 204 to respond to detected viruses in communications or devices of the customer network 204. A malware sandbox feature 210 may also be provided to respond to detected malware attacks on devices or communications of the network 204. In general, the customer network 204 may include any number and type of security services to protect the devices/communications of the network 204 from attack. These services may be installed, managed, configured, and/or altered by a network administrator of the customer network 204. Further, the customer network 204 may utilize the IP network 202 for transmitting communications to other devices or networks to which the security services 206-210 of the customer network 204 may apply. For example, the customer network 204 may utilize the IP network 202 to transmit communication packets to the Internet to interact with webpages, upload data, and/or receive data from the Internet. Through a combination of security services 212-216 provided by the IP network 202 and the security procedures/devices 206-210 instituted in the customer network 204, a security infrastructure profile 220 for the customer may be established to secure communications associated with the customer network 204.

In one implementation, a security management system 218 may communicate with the IP network 202 and the customer network 204 to manage the security infrastructure 220. Although shown as separate from the IP network 202, the security management system 218 may be instantiated within IP network, such as illustrated in the network 102 of FIG. 1. The security management system 218 may thus be a service provided by IP network 202 or may be a separate service provided by a third party. In general, the security management system provides configurations and updates to the devices and services 206-216 of the security infrastructure 220 in response to threat data or information, as described in more detail below.

Figure 3:
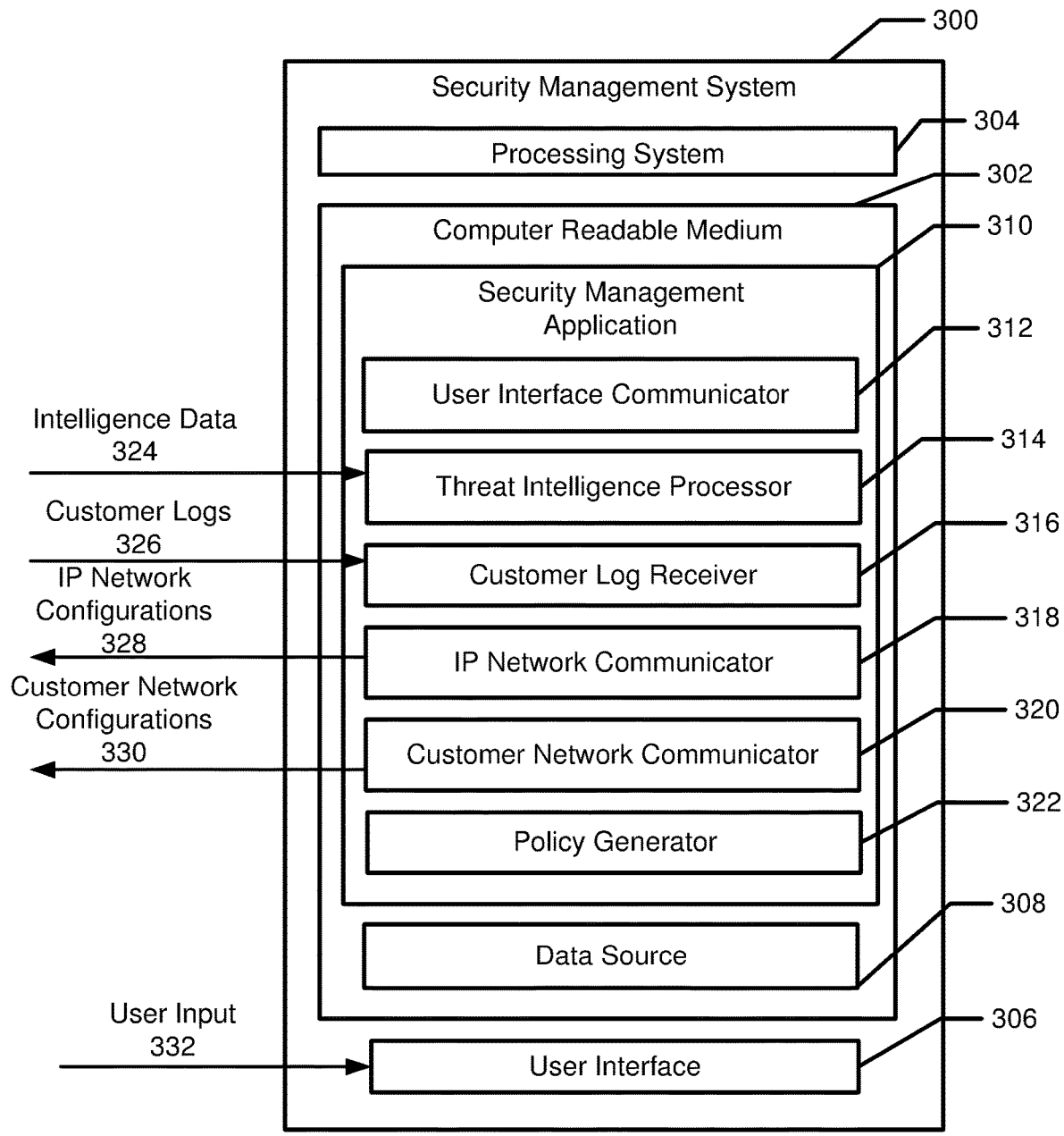
FIG. 3 is a schematic diagram illustrating a security management system for managing security protocols and devices of a communications network in accordance with one embodiment.

FIG. 3 is a schematic diagram illustrating a security management system 300 for managing security protocols and devices of a communications network. The security management system 300 of FIG. 3 may be the security management system 218 for managing the security infrastructure 220 of the customer network 204. In some instances, a security management application 310 may be executed on the security management system 300 to perform one or more of the operations described herein. The security management application 304 may be stored in a computer readable media 302 (e.g., memory) and executed on a processing system 304 of the security management system 300 or other type of computing system, such as that described below. For example, the security management application 304 may include instructions that may be executed in an operating system environment, such as a Microsoft Windows™ operating system, a Linux operating system, or a UNIX operating system environment. The computer readable medium 302 includes volatile media, nonvolatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the security management system 302 also provides a user interface (e.g., a command line interface (CLI), a graphical user interface (GUI), etc.) 306 displayed on a display, such as a computer monitor, for displaying data. Through the user interface 306, a user of the security management system 300 may provide customer input 332 through one or more input devices. The customer input 332 may be used by the security management system 300 to, among other things, identify one or more sub-systems of a security infrastructure associate with a network, identify one or more security profiles to apply to the sub-systems, receive approval to execute one or more security procedures, and the like. The input device for providing the customer input 332 may include, among others, a keyboard or a pointing device (e.g., a mouse, trackball, pen, or touch screen) to enter data into or interact with the user interface 306.

In one example, the user interface 306 may communicate with other components in the security management application 310 to receive user input for manipulating or otherwise modifying the operation of the security management application. For example, user interface communicator 312 may communicate with user interface 306 to receive customer input 332 for use by the other components of the security management application 310. The user interface m communicator 312 may also provide information to for display via the user interface 306, such as components and services included in the security infrastructure associated with a customer or user of the security management system 300. As another example, the user interface 306 may receive user input for modifying and/or reviewing a customized security infrastructure on a display associated with the security management system 300 and provide the modification to the user interface communicator 312 for processing.

The security management application 310 may also utilize a data source 308 of the computer readable media 302 for storage of data and information associated with the security management system 300. For example, the security management application 310 may store information associated with the services and devices of the security infrastructure of the customer, including access information to security devices, application programming interface (API) information, data and information received through components of the application 310 (including device logs 326 from devices of the security infrastructure, threat intelligence information 324), geographic information of devices and services of the security infrastructure, devices and services included in sub-systems of the security infrastructure for a customer, and the like. In general, any data or information utilized by the security management application 310 may be stored and/or retrieved via the data source 308.

The security management application 310 may include several components to perform one or more of the operations described herein. For example, a threat intelligence processor 314 may be included in the security management application 310 to receive and process threat intelligence information 324 from one or more threat sources. Threat intelligence data 324 may include information associated with identified or potential threats against a computing device or a network of computing devices. The intelligence information or data 324 may be transmitted or otherwise provided to the security management system 300 from one or many sources, including government sources of potential or identified threats, third-party sources, or analysis of network communications and traffics conducted by an IP network 102. The threat intelligence data 324 may include any information to identify potential threats to computing devices, such as source or destination IP addresses associated with a potential threat, source or destination domain names associated with a potential threat, identification of malware files, identification of phishing attempts and details of communications associated with the phishing attempts, and the like. In general, any information 324 associated with a potential or identified threat to a computing device may be collected and provided to the threat intelligence processor 312.

In some instances, the threat intelligence data 324 may include a confidence score associated with one or more packets of data. For example, an identification of a source or destination IP address may be associated with a risk score that indicates a likelihood of risk to a computing device for that identified IP address. In one implementation, the risk score may include a confidence value, a decay value, and/or a severity value. The confidence value may indicate a confidence in the identification of the particular threat and may include an indication of how dispersed the threat, the number of false identifications of threats associated with the IP address, a number of sources indicating the IP address as a threat, and the like. The IP network 102 may, in some instances, include a threat intelligence system that processes received threat intelligence information and provides the confidence score to the threat. Some identified threats may be discarded by the IP network 102 when an associated confidence score is below a confidence threshold. In this manner, the threat intelligence system of the IP network 102 may only include threats in the threat intelligence data 324 that exceed a confidence threshold to prevent false identification of potential threats.

The risk score for the intelligence data 324 may also include a severity indication. The severity indication may correspond to a type of threat to a computing device or network associated with the identified threat. For example, the threat may be identified as a direct attack on the receiving computing device and assigned a high severity score, such as a virus that deletes crucial files on the receiving computing device. Less severe threats, such as malware programs that operate in the background of the receiving computing device, may have a lesser severity score while other threats, such as a program to scan the files of a receiving computing device, may have an even lesser severity score. Thus, the type of threat associated with the IP address identification may correspond to the severity score associated with the threat. Further, the risk score for a potential or identified threat may include a decay function that indicates the newness of the threat or otherwise corresponds to the length of time from which the threat was identified or last experienced within the network 102. The decay indicator may provide a higher risk score to those threats that are identified as newer than those threats that are identified further in the past. As explained in more detail below, the risk score associated with the threat intelligence data 324 may be utilized by the security management application 310 to determine actions to be performed on security services or devices 206-216 of the customer network 204 and/or the IP network 202 of the security infrastructure 220.

A customer log receiver 316 may also be included in the security management application 310 to receive event logs 326 from one or more security devices of the customer network 204. One or more of the customer network security devices 206-210 (such as the customer network firewall device) may generate and provide event logs 326 that include activities and events of the security device. For example, each communication packet received and analyzed by the firewall device 206 may be noted in the device log, along with an action (deny, allow, block, re-direct, etc.) taken by the firewall device on the packet. In general, any activity conducted by the security device 206-210 of the customer network 204 may be included in an event log of the corresponding security device and transmitted to the customer log receiver 316 of the security management application 310. As explained in more detail below, the information or data of the event logs 326 of the customer network devices 206-210 may be used by the security management application and/or the customer log receiver 316 to configure the customer network security devices based on the log information.

As also explained in more detail below, the security management application 310 may configure or alter a configuration of one or more security devices or services of the security infrastructure 220 based on received information or data, such as the threat intelligence data 324, the user input 332, and/or the event logs 326 of the customer network security devices 206-210. To configure the devices and services of the security infrastructure 220, the security management application 310 may include an IP network communicator 318 to generate and transmit configuration instructions 328 to the services and devices of the IP network 102. For example, the IP network communicator 318 may generate an instruction to add a newly generated firewall rule and provide the new firewall rule to a firewall device 212 or service of the IP network 102. In some instances, the firewall service may be instantiated on an application server or across many network devices such that the configuration instructions 328 for the firewall 212 may be transmitted to the targeted device of the network 102 associated with managing the firewall rule set. Other configuration instructions 328 for other security devices and services of the IP network 202 may also be generated and transmitted by the IP network communicator 318 of the security management application 310.

In a similar manner, the security management application 310 may include a customer network communicator 320 for generating and/or transmitting configuration instructions to customer network security devices and/or services 330 in response to received information or data, such as the threat intelligence data 324, the user input 332, and/or the event logs 326. Either or both of the IP network communicator 318 and the customer network communicator 320 may utilize an API or other translating program to generate a configuration instruction that the receiving device may process. Access information, such as log-in credentials and/or password information, may also be used by the communicators 318, 320 to provide the configuration instructions 328, 330. Through the communicators 318, 320, the security management application 310 may configure the devices and services 206-216 of the security infrastructure 220 associated with a customer of the IP network 202 in response to data received associated with potential threats to computing devices and networks.

It should be appreciated that the components described herein are provided only as examples, and that the application 310 may have different components, additional components, or fewer components than those described herein. For example, one or more components as described in FIG. 3 may be combined into a single component. As another example, certain components described herein may be encoded on, and executed on other computing systems, such as on one remotely coupled to the security management system 300.

Figure 4:
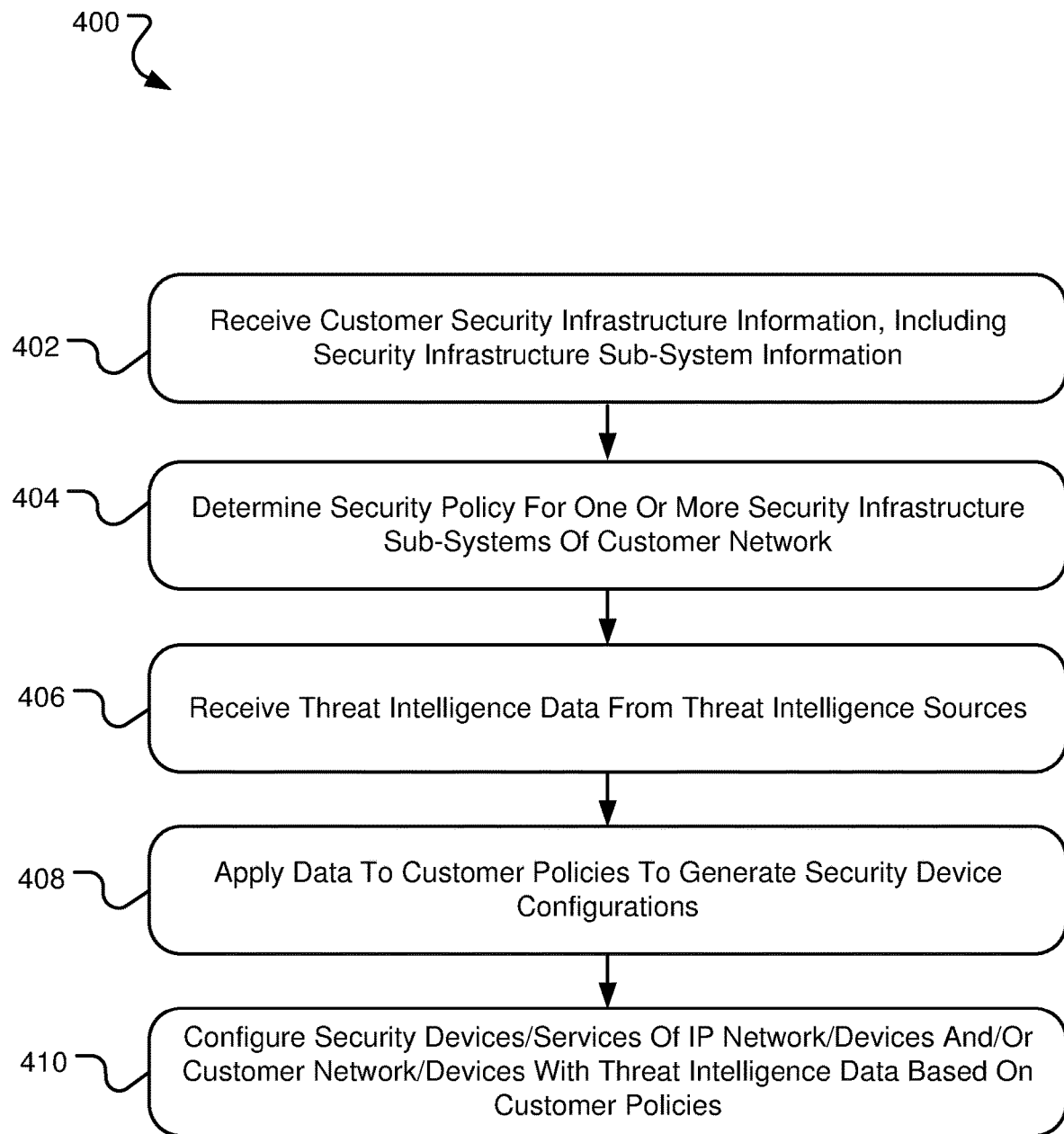
FIG. 4 is a flowchart illustrating a method for utilizing threat intelligence data for configuring network security devices in accordance with one embodiment.

As mentioned, the security management system 300 of FIG. 3 may manage one or more security devices or policies of a security infrastructure 202 of one or more communication networks 202, 204 based on threat intelligence information received from one or more sources in response to potential threats to computing devices or networks associated with the security infrastructure. FIG. 4 is a flowchart illustrating a method for utilizing such threat intelligence data for configuring network security devices of the security infrastructure. In general, the operations of the method 400 of FIG. 4 may be performed or executed by the security management system 300 discussed above. The operations may be performed by one or more software components of the security management application, one or more hardware components, the execution of one or more software instructions, or a combination of both hardware components and software components. In general, any number and type of components of the telecommunications network 102, including and separate from the security management system 218, may perform one or more of the operations of the method 400 of FIG. 4.

Figure 5:
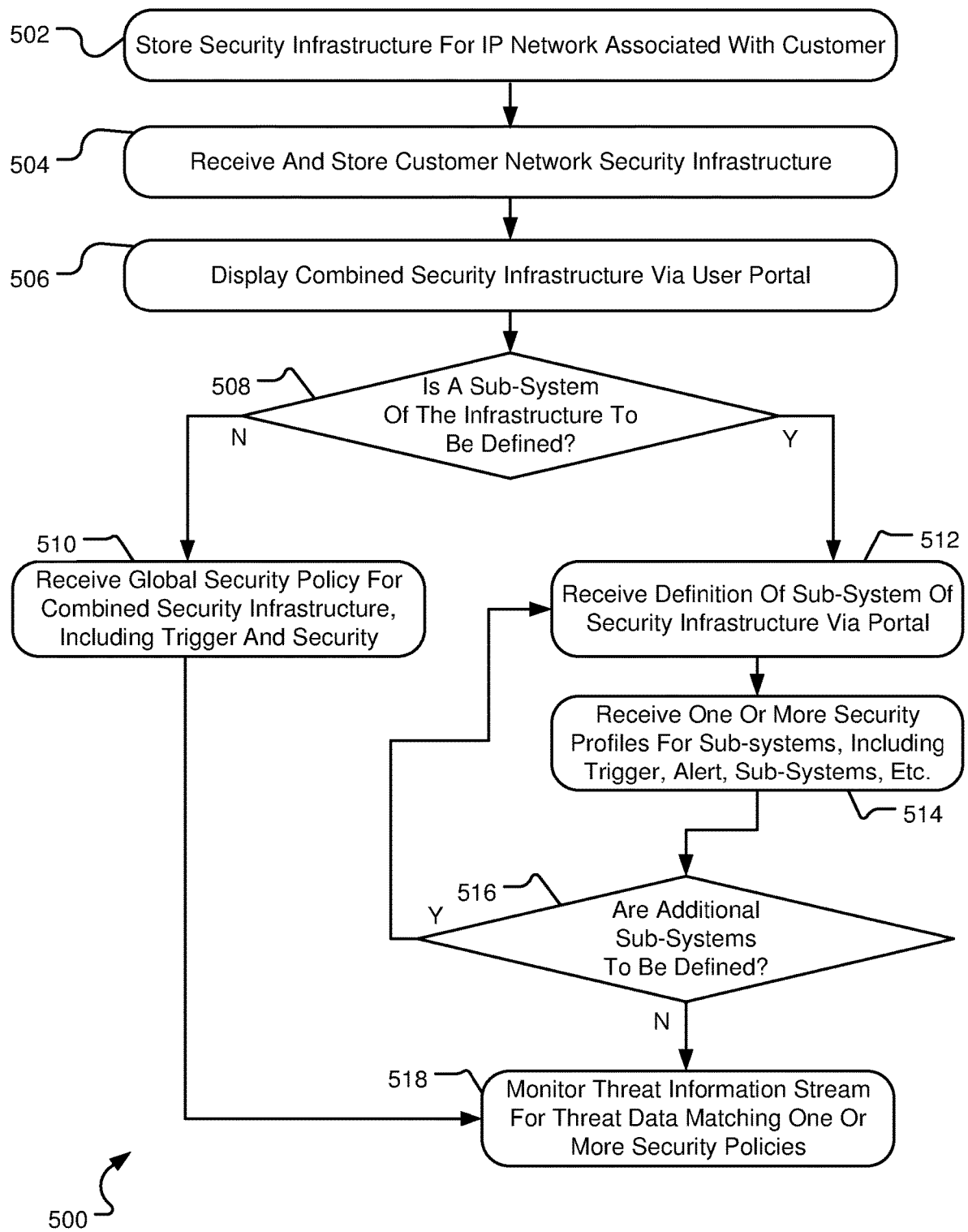
FIG. 5 is a flowchart illustrating a method for defining security policies to apply to security systems or sub-systems of a network in accordance with one embodiment.

Beginning in operation 402, the security management system 218 may receive customer security infrastructure information, including one or more security infrastructure sub-system information and generate a security infrastructure profile for the customer. The security infrastructure profile may include devices, networks, services, etc. that the customer network utilizes to provide one or more security features to computing devices and communications associated with the customer network. Further, one or more security policies may be associated with the security infrastructure 220 and/or the sub-systems of the infrastructure in operation 404. One method for obtaining or receiving the security infrastructure profile and determining a security policy for the sub-systems is illustrated in the flowchart of FIG. 5. In particular, FIG. 5 illustrates a method 500 for defining security policies to apply to security systems or sub-systems of a security infrastructure 220 associated with a network 204. Similar to the method 400 of FIG. 4, the operations of the method 500 of FIG. 5 may be performed by the security management system 218 described above.

In operation 502, the security management system 218 may receive and/or store security infrastructure information for an IP network associated with providing one or more security services to a customer network. Using the network environment 200 of FIG. 2 as an example, the security management system 218 may store an identification of the security services 212-216 provided by the IP network 202 to communications into and out of customer network 204. The security services (and/or security devices) 212-216 provided by the IP network 202 may provide one or more security services for customer network 204. The information stored by the security management system 218 may include the types of services provided, the device or devices of the IP network 202 associated with providing those services, access information for configuring the security services and devices, and the like. As mentioned, the IP network security services 212-216 may comprise part of the security infrastructure for the customer network 204.

In operation 504, the security management system 218 may receive and store customer network security infrastructure information. For example, the customer network 204 of FIG. 2 may include one or more security devices and/or services 206-210, such as a firewall device 206, anti-virus security protection 208, malware sandbox services 210, etc. Information associated with these devices/services 206-210 may be provided to the security management system 218 and stored with the security services 212-216 provided by the IP network 202 to generate the security infrastructure 220 for the customer network. As shown, the security infrastructure 220 for the customer network 204 may thus include security services and devices 206-216 provided by the customer network 204 and the IP network 202. In some instances, the security infrastructure 220 information may be provided to the security management system 218 through the user interface 306 of the security management system 218 by a user of the system. In another implementation, the security services/devices 206-216 of the infrastructure 220 may communicate with the security management system 218 to provide the infrastructure information to the system. Regardless of how the customer network security infrastructure information is provided or obtained, the security management system 218 may store or otherwise retain the infrastructure information for use in configuring one or more aspects of the security for the customer network 204.

In operation 506, the security management system 218 may display the security infrastructure 220 for the customer network 204 to a user via a user portal, such as user interface 306 discussed above. A user of the security management system 218 may log into or otherwise access the user interface 306 to review the security infrastructure 220 for the customer network 204. In some instances, the user may be an administrator of the customer network 204 tasked with managing the security features and services of the customer network. With the security infrastructure 220 displayed via the user interface 306, the security management system 218 may determine if a sub-system of the infrastructure is to be defined in operation 508. In one instance, the security management system 218 may query the user via the user interface 306 if a sub-system of the security infrastructure 220 is to be defined. In another instance, the user may request to define one or more sub-systems of the security infrastructure 220 via the user interface 306 through one or more commands provided to the security management system 218 through an input device.

If no sub-system of the infrastructure is to be defined, the security management system 218 may determine or receive a global security policy for the security infrastructure 220 associated with the customer network 204. In general, a security policy defines one or more security configuration actions to take upon one or more devices or services 206-216 of a security infrastructure 220 in response to threat intelligence information or data 324. In one implementation, the global security policy for a security infrastructure 220 may be provided by to the security management system 218 via the user interface 306. In another implementation, one or more aspects of the global security policy may be determined and added to the security policy by the security management system 218 based on one or more security policy rules or guidelines.

A global security policy for a security infrastructure 220 may include aspects of providing protection to the customer network 204 in response to threat intelligence data 324. In one example, the global security policy may include a trigger profile, a type of security alert, one or more actions to partake, and a listing of devices/services for application of the defined actions, and the like. A security policy trigger profile may include definitions or thresholds of a portion of the threat intelligence data 324 that, when met by the threat intelligence data, triggers an action to be undertaken by the security management system 218. For example, the threat intelligence data 324 may include an entry for a perceived threat to the network. The threat intelligence data entry may include various aspects of information or data associated with the identified threat. The security policy trigger, therefore, may include thresholds or definitions that may be compared to similar information retrieved from entries of the threat intelligence data 324. For example, the security policy trigger may include such thresholds or indicators as a risk score threshold, a threat category or type, and/or an indicator of the type of information included in the threat intelligence data. A risk score associated with the threat intelligence data 324 is discussed above and generally is a score or value that indicates the likelihood of the identified threat indicated by the threat intelligence data 324 as harmful to a network device. Another aspect of the security policy trigger may be a threat category or type associated with the entry. The threat category may indicate if the detected threat of the threat intelligence data 324 entry relates to a direct attack on the network devices, such as a virus or similar type of attack, a malware program, a scan program, a keystroke tracking software, etc. A system that provides the threat intelligence data 324 may categorize each threat entry into one or more of a plurality of threat categories, which may be used by the security management system 218 in a trigger. Yet another aspect of the policy trigger may be an indicator type of the threat intelligence data 324 received at the security management system 218. The indicator type provides information of the type of identification of the threat, such as a threat associated with a source or destination IP address, a threat associated with a source or destination domain name, a threat associated with a file type, etc. In general, however, the security policy trigger may include any aspect of the threat intelligence data 324.

As explained in more detail below, the security management system 218 may compare the received threat intelligence data 324 to the one or more defined triggers to determine if a security policy action may be taken. For example, a threat intelligence entry may include a risk score, a threat category, and an indicator type. In circumstances where the threat category and indicator type match the defined threat category and indicator type of the trigger and the risk score of the threat data entry meets or exceeds the risk score defined in the trigger, a security action may be implemented by the security management system 218 on one or more security devices of the security infrastructure 220. In some instances, the action taken by the system 218 in response to the threat intelligence data 324 meeting the thresholds or values of the trigger may also be defined or provided to the system 218 via the user interface 306. Thus, in operation 510, the security management system 218 may also receive the actions to be executed or performed by the system when the trigger conditions are met. For global security policies, a triggered security action may be applied to each device/service of the security infrastructure 220 defined above. The application of security actions to the security infrastructure 220 is described in more detail with relation to FIG. 7. In operation 518, the security management system 218 may begin to monitor a threat information stream of data to identify threat data matching one or more of the triggers of the security policies associated with the security infrastructure 220 of the customer network 204.

In some instances, one or more sub-systems of the security infrastructure 220 may be defined or generated and a security policy particular to the sub-system may be applied by the security management system 218. If a sub-system of the security infrastructure 220 is to be defined as determined in operation 508, the security management system 218 may receive the definition of a sub-system of the security infrastructure 220 in operation 512. In one example, a user of the security management system 218 may utilize the user interface 306 to select or otherwise indicate the security devices/services 206-216 to be included in one or more sub-systems of the security infrastructure 220. Further, the sub-systems of the security infrastructure 220 may include any of the security devices/services 206-216 of the infrastructure 220. For example, a sub-system of firewall devices 206, 212 of the infrastructure 220 may be created. A different sub-system of IP network services/devices 212-216 may also be generated. Other sub-systems may be created based on geographic location of the security devices/services of the infrastructure. For example, a security infrastructure 220 may include a first set of security devices/services instantiated in a first geographic location, such as North America locations, and a second set of security devices/services instantiated in a second geographic location, such as European locations. A sub-system of the security infrastructure 220 may be based on any aspect of the infrastructure, including but not limited to, the location of the devices/services, the type of security devices/services, the sensitivity of information or data protected by the security devices/services, local regulatory constraints, network configuration, etc.

In operation 514, the security management system 218 may receive or determine a security profile for each of the sub-systems of the security infrastructure 220. The security profile for each sub-system may include a trigger as described above, an action to be executed by the security management system 218 on the devices/services of the sub-system, an alert type, etc. An alert type may indicate a type of alert that may be generated by the security management system 218 in response to a satisfied trigger condition. In one example, the security management system 218 may include a proactive alert type and an interactive alert type. The proactive alert type indicates actions that are taken or executed by the security management system 218 in response to a satisfied trigger condition. An interactive alert type, described in more detail below, indicates an alert generated to one or more receivers associated with the security infrastructure 220. A positive response to the generated alert may instruct the security management system 218 to execute the associated actions. In addition, the security policies associated with the security infrastructure 220 may indicate which sub-systems of the infrastructure are associated with a trigger/defined action. For example, a first action or set of actions may be executed on a first sub-system of the security infrastructure 220 in response to a satisfied trigger condition as defined by the trigger. A second action or set of actions may be executed on a second sub-system of the security infrastructure 220 in response to a satisfied trigger condition. Further, the first set of actions and the second set of actions may be executed on the sub-systems in response to the same trigger conditions, with the first set of actions being different than the second set of actions. In this manner, the security policies for each sub-systems of the security infrastructure 220 may be defined, including a trigger condition as related to the threat intelligence information, alert types for a satisfied trigger condition, actions to be performed or executed in response to the trigger, and one or more sub-systems associated with the actions to be performed. These policies may be maintained or stored by the security management system 218.

In operation 516, the security management system 218 may determine if additional sub-systems of the security infrastructure 220 are to be defined, such as through a query to a user of the user interface 306 of the security management system. If additional sub-systems are to be defined, the security management system 218 may return to operation 512. If no additional sub-systems are to be defined, the security management system 218 may proceed to operation 518 to monitor the threat information stream for threat intelligence data that matches the one or more security policies of the security infrastructure 220 associated with customer network 204.

Figure 6:
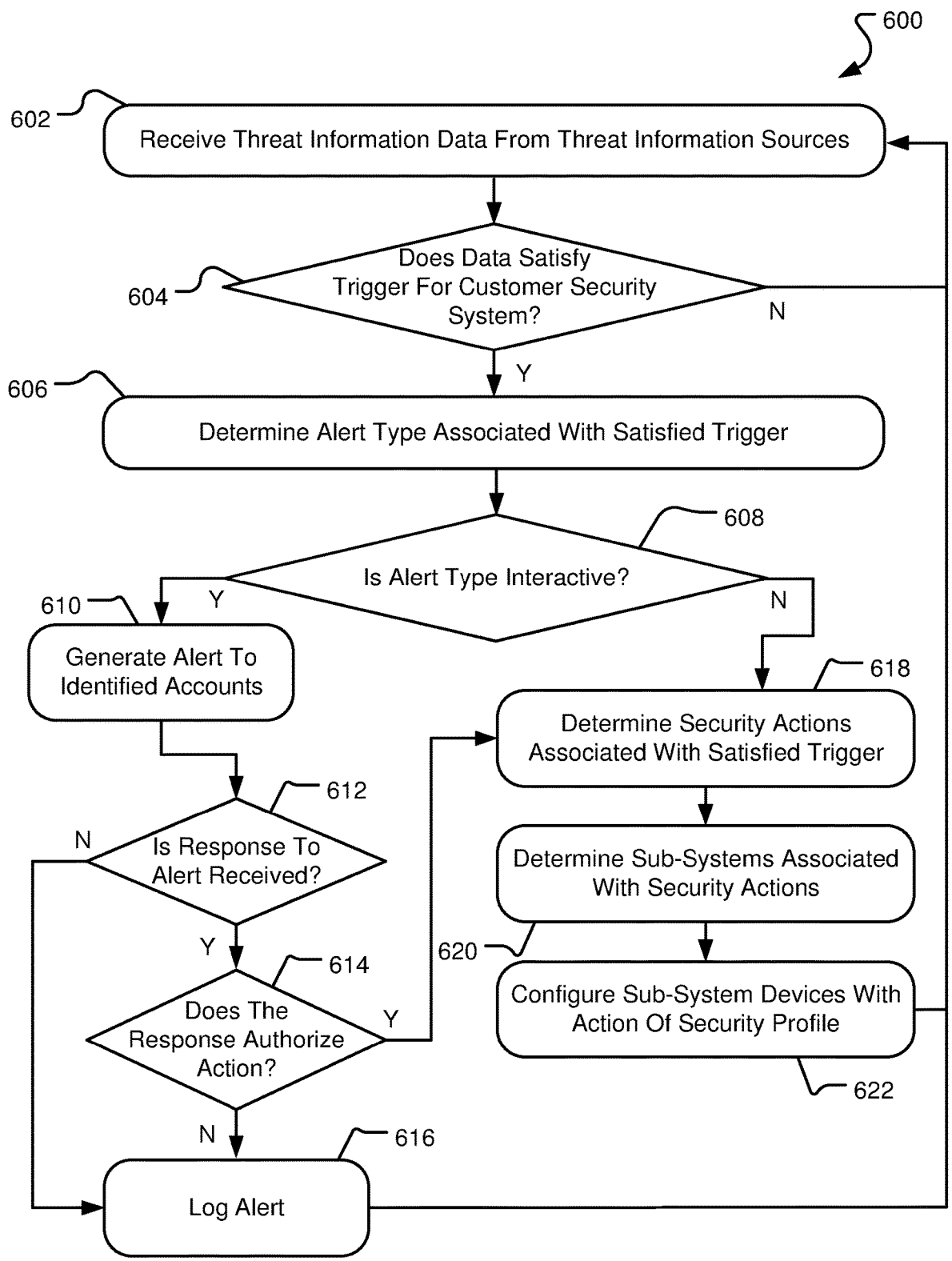
FIG. 6 is a flowchart illustrating a method for configuring one or more network devices based on threat intelligence data in accordance with one embodiment.

Through the method 500 of FIG. 5, the security management system 218 may receive or determine the customer security infrastructure 220 including sub-systems and one or more security policies for the infrastructure. Returning to the method 400 of FIG. 4, the security management system 218 may receive threat intelligence data from one or more threat intelligence sources in operation 406. A threat intelligence processor 314 of a security management application 310 may receive the intelligence data 324. Further, the security management system 218 may apply the received threat intelligence data to one or more of the security policies of the security infrastructure 220 associated with the customer network 204 in operation 408 to determine any threat data entry that matches or satisfies the conditions of a security trigger, as discussed above. One or more security devices/services of the security infrastructure 220 may be configured or altered based on a threat entry that matches a trigger of the security policies associated with the customer network 204 in operation 410. In particular, FIG. 6 is a flowchart illustrating a method 600 for configuring one or more network devices based on threat intelligence data 324. Similar to the methods described above, the operations of the method 600 of FIG. 6 may be performed by one or more of the components of the security management system 218.

Beginning in operation 602, the security management system 218 may receive threat intelligence data 324 from one or more threat intelligence sources. The threat intelligence data 324 may include one or more entries of information of potential threats to a network or computing devices, including a type of threat to the computing device (e.g., scan, virus, attack, malware, etc.), identifying information of an associated computing device or source (e.g., source IP address, destination IP address, domain name, file name, etc.), a risk score or confidence indicator of the threat, and any other information about a potential threat to the network or computing devices of the network. In operation 604, the security management system 218 may determine if one or more of the entries of the threat intelligence data 324 matches or satisfies a security trigger associated with a security infrastructure 220 of a customer network 204. As discussed above, the trigger may include thresholds or identifications corresponding to one or more entries of the data within the threat intelligence data 324. For example, a trigger may include a risk score threshold value corresponding to a risk score associated with entries in the data 324, a threat category corresponding to threat categories of the threat data, and/or an indicator type corresponding to a type of threat indicated in the data. The security management system 218 may then compare aspects of one or more entries of the threat intelligence data 324 to the security policy triggers associated with the security infrastructure 220 to determine if one or more entries satisfy the conditions of the security triggers. If an entry of the threat data 324 does not match or satisfy the security triggers of the security infrastructure 220, the security management system may return to operation 602 to receive additional threat data from the threat information sources.

If the threat data 324 matches or satisfies the conditions of a security trigger of the security infrastructure 220, the security management system 218 may determine an alert type associated with the satisfied trigger in operation 606. As discussed above, a security trigger of a policy associated with the security infrastructure 220 may indicate an alert type, such as if the alert type is a proactive alert or an interactive alert. If the security management system 218 determines that the alert type is interactive, the system may generate an alert and transmits the alert to one or more receiving accounts in operation 610. For example, the interactive alert may be transmitted to a security administrator of the customer network 204 via an email address, text message, phone call, displayed in the user interface 306, etc. associated with the security administrator. In general, any number of receiving accounts may receive the interaction alert from the security management system 218.

The interactive alert generated in response to the satisfied security trigger may include recommendations for alterations or configurations to one or more devices/services of the security infrastructure 220 based on the threat data corresponding to the trigger. For example, the alert may include a list of firewall rules generated in response to the received threat data 324 and a list of potential firewall devices 206, 212 of the security infrastructure 220. Other recommendations, such as additions of an identification of a potential virus or malware program, may also be included in the interactive alert. Further, a receiver or receiving device of the alert may respond to the alert with several options, including but not limited to, instructions to deploy some or all of the recommendations, edit one or more of the recommended actions, defer the recommended actions for a later time, log the alert and the recommended actions, and the like. Thus, in operation 612, the security management system 218 may determine if a response to the interactive alert is received with one or more of the above options. The response may be received, in some instances, through an electronic message from the receiver, a telephone call, a text message, via the user interface 306, and the like. If a response to the alert is not received, the alert may be logged for the customer or user of the security management system 218 in operation 616 for later use. In some embodiments, an interactive alert may be associated with a time frame for responding such that when set time has elapsed, the alert is deemed to be unresponsive and logged by the system 218. The time limit associated with an alert may vary based on any aspect of the alert, such as alert type or risk score.

If the security management system 218 receives a response, the system may determine, in operation 614, if the response includes an authorization of one or more of the recommended actions included in the alert. An authorization to execute one or more of the recommended actions may include revisions to suggested actions in addition to or in place of acceptance of a recommended action. If the response to the alert does not authorize the execution of an action on the security infrastructure, the security management system 218 may log the alert for the customer in operation 616.

If the type of alert associated with the security trigger is not interactive or the response to the interactive alert authorizes an action to be executed on the devices/services of the security infrastructure 220, the security management system 218 may, in operation 618, determine which security actions to execute. For example, the trigger may be associated with one or more actions, such as the addition of firewall rules to firewall devices or the implementation of services within the customer network 204 and/or IP network 202. In another example, the response to the interactive alert may include a revised recommended action to be executed by the system 218. The actions associated with the alert may include any alteration, adjustment, configuration, addition, and the like to the networks 202, 204 associated with the security infrastructure 202 or any devices/services associated with the security infrastructure. For example, an action executed by the security management system 218 may include adding a firewall rule to one or more firewall devices 206, 212, adding an indicator to an anti-virus list or anti-virus software to block downloading or requesting the potential virus, adding a blocked domain name to a list of blocked domains of a secure DNS 214, alerting a response provided by the secure DNS 214 in response to a blocked domain name, altering an action performed by a firewall device in response to a received communication, updating an identification of a threat packet in one or more devices in the infrastructure, altering a response to a malware-related request to redirect such a request to another destination, and the like. In general, any action or configuration of the security infrastructure 220 associated with the customer network 204 may be performed by the security management system 218 in response to the trigger, the alert, and the designated action.

The security management system 218, in operation 620, may determine which sub-systems are associated with which actions of the trigger for execution of those actions. For example, a trigger may be associated with many actions or configurations, with each of the actions designated for execution on any number of sub-systems of the infrastructure 220. Some global actions may be applied to all devices/services of the infrastructure 220, while other designated actions may be associated with one or more sub-systems of the infrastructure. For example, an action to add a firewall rule may be applied to a sub-system of the infrastructure 220 of firewall devices/services. Another action may be applied to only North American-located devices. Any number of actions may be executed on any number of sub-systems of the infrastructure in response to a satisfied trigger condition. As such, the security management system 218 may determine which sub-systems of the infrastructure 220 are associated with which security actions based on the alert generated from the trigger. In operation 622, the security management system 218 may configure one or sub-system devices/services based on the associated action of the security profile associated with the trigger. The executed actions may perform one or more of the actions described above. Execution of the actions may include the security management system 218 accessing or otherwise communicating with the target security devices/services and providing one or more configuration instructions to the target devices/services. The system 218 may utilize one or more APIs to generate and transmit the configuration instructions. Upon configuration of the security infrastructure 220 or after logging an interactive alert, the security management system 218 may return to operation 602 to receive additional threat information data 324 from the threat information sources.

Through the systems and methods described above, the security management system 218 may utilize network threat information to manage one or more security devices or policies of a security infrastructure 220 associated with a customer network 204. The security system 218 may receive threat intelligence data 324 or information associated with potential threats to a communications network and process the threat intelligence data to determine one or more configurations to apply to security devices of a network. For example, the system may apply the data 324 to one or more security triggers comprising threshold values and/or categories. When the threat data satisfies the conditions of the trigger, the security management system 218 may generate a rule or action to respond to the identified attack, such as a firewall rule for a firewall device to block traffic from the source of the attack. In this manner, the security infrastructure 220 may be configured or altered based on the received threat information based on the received threat information that is associated with a customer's network 204 and security infrastructure 220.

Through the systems and methods described herein, the security management system 218 may configure one or more devices/services of the security infrastructure 220 associated with the customer network 204 based on the threat intelligence data 324 received at the system. In some instances, however, the configurations of the security devices/services may be limited or governed based on system or device limitations. For example, a firewall device 206 of the infrastructure 220 may have limited storage capacity for maintaining a firewall rule set that may be considered by the system or system administrator when determining the thresholds of the security triggers of the security policies. In particular, setting a risk score too low may result in overloading or filling the available rule set storage capacity of the firewall 206 as more threat entries of the threat intelligence data 324 may satisfy the threshold of the trigger. This also may prevent a more relevant firewall rule from being included in the firewall rule set for the particular security infrastructure 220. For example, a threat intelligence data entry may have a relatively low score but the devices/services of the security infrastructure 220 may be likely to interact with computing devices associated with the threat. Because the firewall 206 rule set may only include those threats that exceed or meet the risk score threshold value of the trigger, the firewall device 206 may not receive some relevant updates to the firewall rule set.

Figure 7:
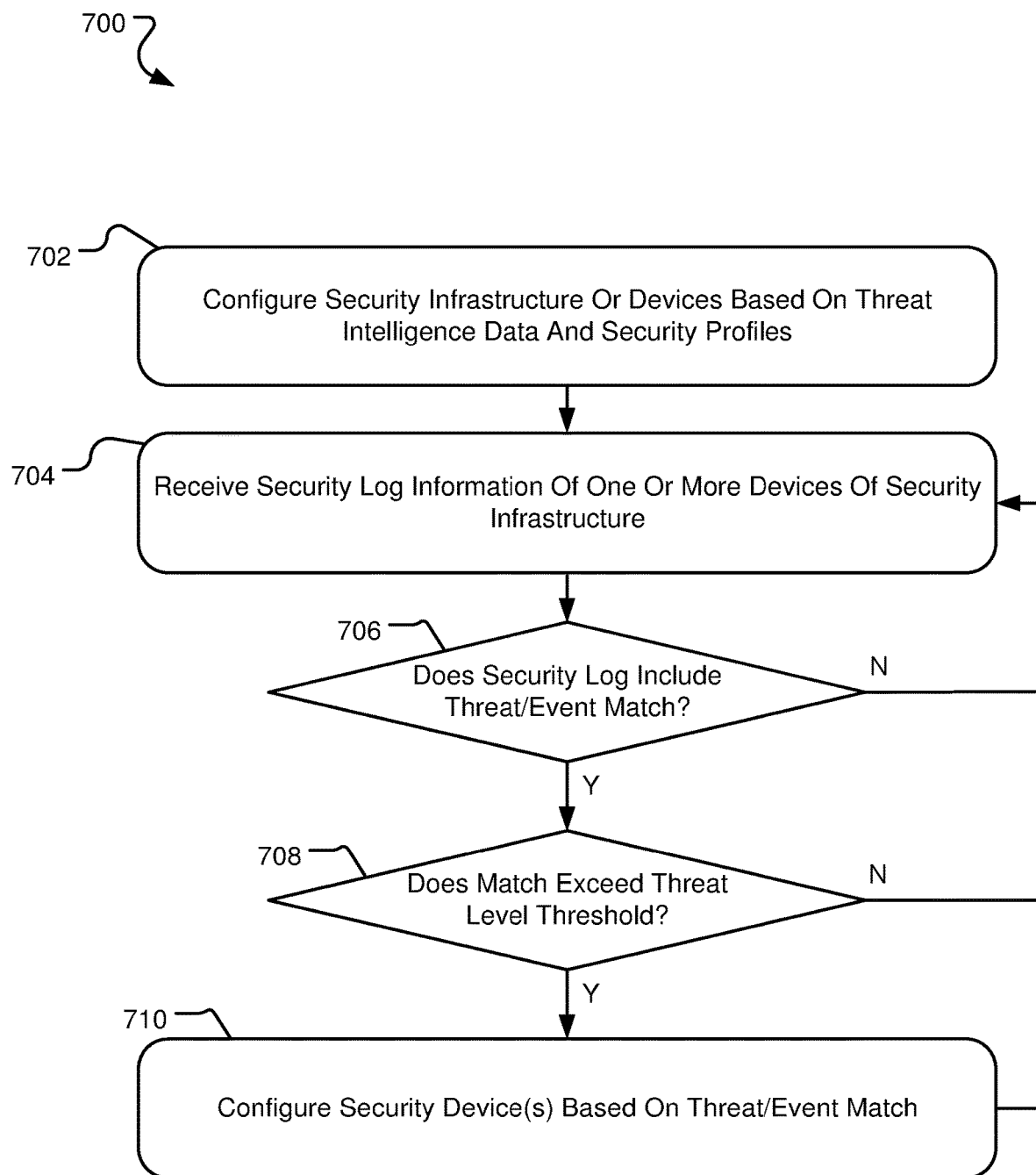
FIG. 7 is a flowchart illustrating a method for updating a configuration of a network device based on a match between a device event and threat intelligence data in accordance with one embodiment.

FIG. 7 is a flowchart illustrating a method 700 for updating a configuration of a network device based on a match between a device event and threat intelligence data. The method 700 may be performed by one or more components of the security management system 218 discussed above, including one or more hardware components, one or more software programs, or a combination of both hardware and software components. Through the method 700, the security management system 218 may update or configure one or more security devices/services of a security infrastructure 220 associated with a customer network 204.

Beginning in operation 702, the security management system 218 may configure one or more devices or services of a security infrastructure 220 based on threat intelligence data 324 and one or more security profiles associated with the infrastructure. The configuring of the security infrastructure 220 may occur through the methods and systems described above. For example, a security policy for the infrastructure 220 may define a security trigger to add any threat of the threat intelligence data 324 that exceeds a risk score of 90 to firewall device 206. Through the security trigger, the firewall 206 rule set may be populated with those threats that are identified in the data 324 as exceeding the threshold risk score. However, the rule set may not capture all potential threats to the firewall device 206. Thus, in operation 704, the security management system 218 may receive security or event log information 326 from one or more security devices of the infrastructure 220. For example, the firewall device 206 may log events or actions taken by the firewall device, including but not limited to, each communication packet received and analyzed by the firewall device, actions (e.g., deny, allow, block, re-direct, etc.) taken by the firewall device on the packet, addition or deletion of firewall rules from the rule set, and the like. In general, any activity conducted by the security device 206 may be included in an event log 326 of the corresponding security device and provided to the security management system 218.

In operation 706, the security management system 218 may compare information or data received in the device log 326 to one or more entries in the threat intelligence data 324. For example, a log entry 326 may include an IP source address from which an analyzed communication packet is received at the firewall device 206. In addition, an entry in the threat intelligence system 218 may include the same source IP address as the source of a potential threat against the network 204 or a computing device of the network. In general, any component of the entry in the device log 326 may match or correspond to any component of the entry in the threat intelligence data 324 to generate a match condition of the threat entry and the event entry. In another example, a file name identified as including a potential virus or malware program as included in a threat entry 324 may be compared with a file name indicator noted in the event log 326 of the firewall device 206. Thus, the security management system 218 may compare any aspect of the device logs 326 to any aspect of the entries in the threat data 324 to determine if a match occurs. If no match between an entry in the threat intelligence data 324 and the log entries occurs, the security management system 218 may return to operation 704 and receive additional security log information 326 from one or more security devices of the security infrastructure 220.

If the security management system 218 detects a match between an event log 326 and a threat entry 324, the system may determine, in operation 708, if the information in the threat entry exceeds a threshold value. As explained above, entries of threat data 324 may include a risk score or other type of score to categorize the threat. The security management system 218 may include a risk score threshold associated with threat data entries similar to that discussed above. However, in the method 700 of FIG. 7, the threat level threshold may be different than other trigger threshold values. Continuing the above example, the trigger for the general security policy for firewalls of the infrastructure 220 includes a risk score threshold of 90 or higher for inclusion of a rule in the firewall rule set. For the an event/threat match, however, the risk score threshold value for inclusion of a corresponding rule in the rule set for the firewall 206 may be lower, such as a risk score of 60 or higher. In this manner, threshold values and/or categories associated with the threat entry that match a log entry may be different and/or set at any value, regardless of the other security policies/triggers of the security management system 218.

If the threat level value of the threat entry that matches the event log entry does not exceed the threat level threshold of the security policy, the security management system 218 may return to operation 704 to receive additional even log information 326 for further analysis. If the threat level value of the threat entry that matches the event log entry meets or exceeds the threat level threshold of the security policy, the security management system 218 may configure one or more security devices/services of the security infrastructure 220 in response to the match and according to one or more security policies of the infrastructure. For example, a firewall rule may be generated by the security management system 218 and added to the rule set of a firewall 206 device of the infrastructure. In some instances, a plurality of security devices/services of the infrastructure 220 may be configured in response to the matched threat entry and the log entry. The devices of the infrastructure 220 that are configured in response to the matched threat/event entries may be determined in a security policy associated with the customer security infrastructure 220 and may be executed in a similar manner as the configurations discussed above. Thus, one or more of the security devices/services of the infrastructure may be configured based on log entries received from a device of the infrastructure 220.

Figure 8:
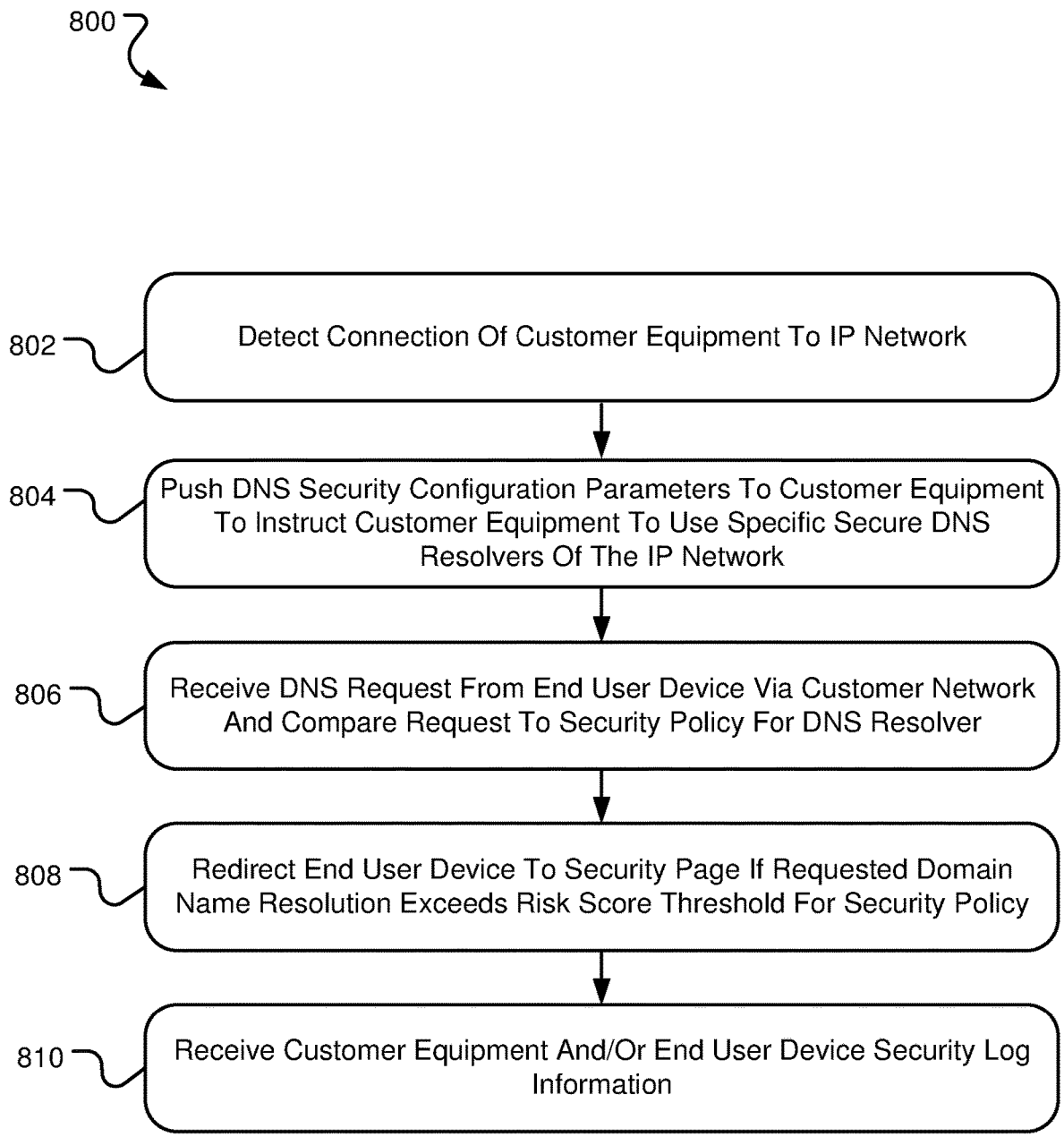
FIG. 8 is a flowchart illustrating a method for providing security control to a customer network requesting DNS access in accordance with one embodiment.

In one specific example, the systems and methods discussed herein may be applied to a Domain Name System (DNS) requests received from a customer network 204, such as a DNS firewall security system or device. In particular, FIG. 8 is a flowchart of a method 800 for providing security control to a customer network requesting DNS access. Prior to receiving the security control, a customer, such as customer network 204 of FIG. 2, to the IP network 202 may obtain high speed internet service from the IP network. Security services associated with the requested high speed internet service may be requested by an administrator of the customer network 204 or may be automatically provided by the IP network 202 as a feature of the internet service. An associated customer profile may be flagged by the IP network 202 and security services related to the internet service may be provided by the IP network 202.

In operation 802, the IP network 202 or a device of the IP network may detect the connection of customer equipment associated with the customer network 204 to the IP network 202. This detection may occur via information provided to a network database after connection and/or monitoring device announcements received at the IP network 202. Upon detection, the IP network 202 may push one or more configuration parameters associated with the DNS security feature to the customer equipment. In one example, the configuration parameters may be pushed automatically to the customer equipment. In another example, the configuration parameters may be requested by the customer equipment upon connection to the IP network 202. In general, the parameter configurations alter or instruct the customer equipment to use specific secure DNS resolvers of the IP network 202 to provide the internet service to the customer network 204. The identification of the secure DNS resolvers (such as an IP address or associated domain name) may also be provided to end user devices of the customer network 204 that utilize the customer network to access the secure DNS resolvers.

End user devices may then utilize the customer network 204 to transmit a DNS request to the secure DNS resolver of the IP network 202. The secure DNS resolver may compare the domain name of the request to the threat intelligence data to determine if the domain name exceeds a risk threshold score. More particularly, the secure DNS resolver may associated with a security policy that includes a risk score for one or more domain names based on the threat intelligence data, as discussed above. For example, a domain name may be flagged as a high risk based on the received threat intelligence data and a corresponding risk score may be associated with the domain name. The security policy for the secure DNS resolver may define a risk score threshold value for known domain names. Requested domain names that exceed the risk score threshold value of the security policy may trigger a mitigation action by the DNS resolver. In one example, the mitigation action may include redirecting the end user device to a security page associated with the IP network 202 in operation 808 of method 800. The security page may notify a user of the end device of the potential risk for accessing webpages associated with the requesting domain name. One or more actions may also be made available via the security page, including an option to abort the request to access the domain name, submit the domain name to the threat intelligence data for further processing, or continue to the potentially unsafe webpage of the requested domain name.

The use of the specific secure DNS resolver allows for aggregated and/or customer specific log collection in operation 810. For example, actions such as allow, block, or override may be collected for each customer network 204 and, in some instances, aggregated upon reporting to a collector device of the IP network 202. In one instance, a network based system may dynamically assigns a unique Wide Area Network (WAN) IP to the customer network 204 may be used to automatically "follow" the dynamically changed IPs that the customer network 204 is assigned and link those to customer specific reports for collection of customer network activities associated with the secure DNS resolver.

In addition, a system within or associated with the customer network 204 may further identify the end devices used in the customer network environment and pass on end user identification information in an end device identifiable manner for per end device reporting granularity. In one instance, customer network equipment may include "local visibility" to the local IP addresses, MAC identifies, the Dynamic Host Configuration Protocol (DHCP) name, and/or manufacturer identification that may be exchanged as a part of the end device local IP address assignment. The DNS requests from such end devices either via local DNS recursive resolvers or directly to the secure DNS resolver of the IP network 202 may include the optional parameters uniquely identifying the end device. The "local visibility" information from the customer equipment and the associated optional parameters uniquely identifying the end device may be passed to the IP network 204 security system may be used to identify the end devices of the customer in the reporting and aggregating of log information. The same procedure may be used to implement even more granular allow/block controls in an automated manner at the end device level rather than customer equipment level of granularity.

At a later date, the customer network 204 may opt out of the secure DNS service. When the user customer equipment (e.g. DSL or Fiber modem/CPE) is connected to the IP network 202, one or more updated opt-out configuration parameters may be obtained/pushed automatically from the security system of the IP network 202 to the customer equipment of the customer network 204, which instructs the customer equipment to use non-secure DNS resolvers for providing the internet service. The same non-secure DNS resolver identification may be passed to the end user devices via the customer equipment. After opt-out, once the end user device accesses resources on the internet using the automatically provisioned non-secure DNS resolvers to request the domain name resolution.

By receiving log information associated with end devices connecting to the IP network 202 via the customer network 204, additional aspects of threat information may be provided and combined with the threat intelligence data discussed above. For example, a system that uniquely identifies end devices may also have the ability to report the behavior of such end devices to the IP network 202, such as by sharing the information for that end device with a network based system. Further, one or more profiles and models of expected behaviors of the end user devices may be created either manually from the received information or via one or more machine learning or artificial intelligence processes of similar end user devices on other environments analyzed in an aggregated manner. The system may also create a score for the end user device behaving within or outside of an expected norm. The score may be utilized by the security system to alert one or more network devices of unexpected behavior of the end user device and/or potentially block traffic associated with the end user device based on the score. The security system may also be configured to include one or more usage controls to end user devices within some granularity. For example, the usage controls may be based on a grouping of end user devices by user group, by time of day, by web category access control, or a combination of the above. For example, an end user device associated with a child based on usage may be controlled to prohibit social media access for some hours of the day, but always allow access to school-related websites.

Figure 9:
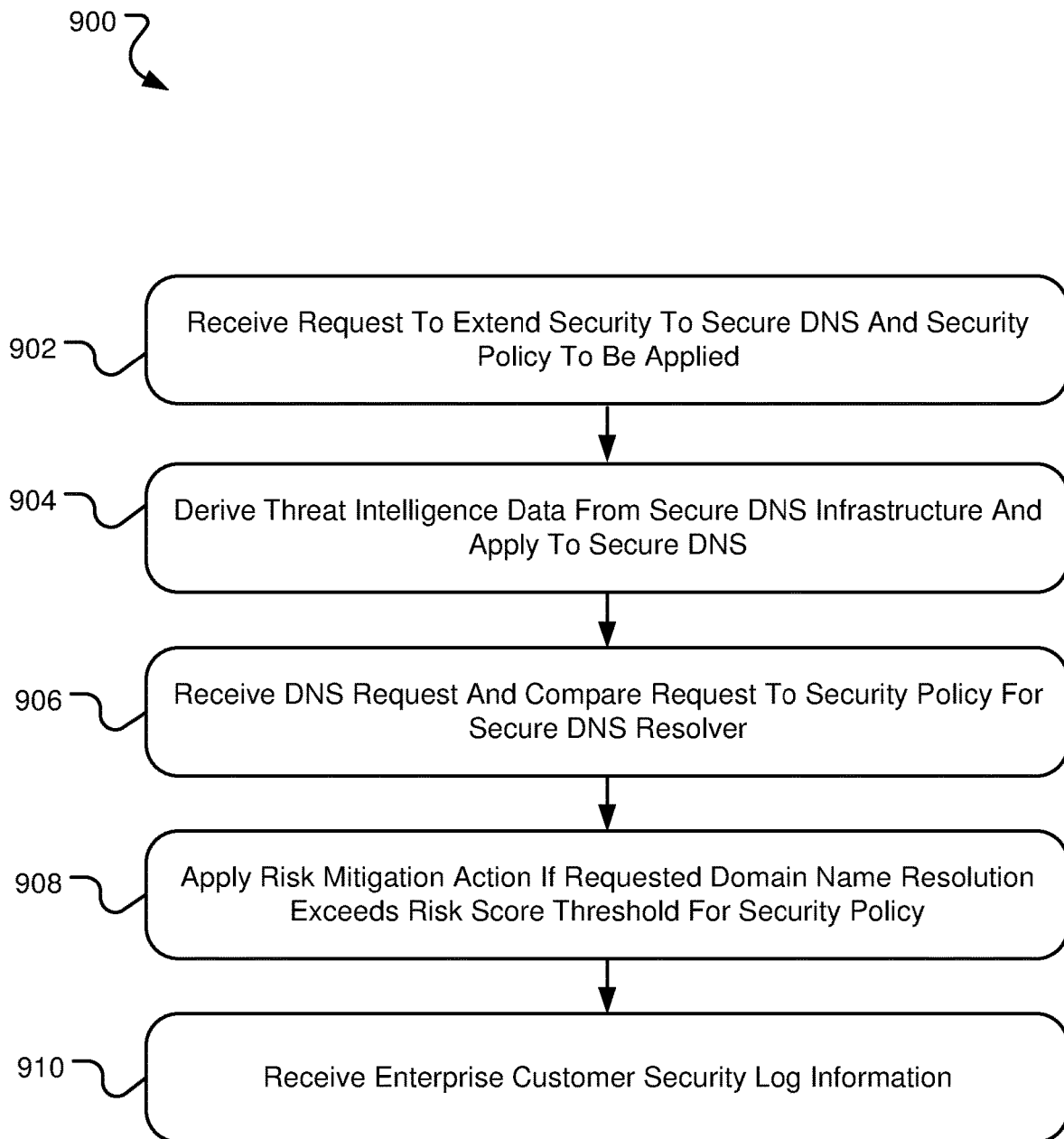
FIG. 9 is a flowchart illustrating a method for providing security control to an enterprise customer network requesting DNS access in accordance with one embodiment.

In one specific example, the systems and methods discussed herein may be applied to a Domain Name System (DNS) requests received from a customer network 204, and in particular from Enterprise customers of the IP network 202. In particular, FIG. 9 is a flowchart of a method 900 for providing security control to an enterprise customer network requesting DNS access. One or more of the operations of method 900 may be performed by the security management system 300 discussed herein. In operation 902, the security system may receive a request from an enterprise network to an IP network 202 for extension of secure DNS functionality to the customer's enterprise network. As part of the request, the enterprise customer may specify a security policy to apply to the secure DNS functionality. For example, the security policy may define risk score threshold value. Domain names associated with a risk score that exceeds the risk score threshold value of the security policy may have a mitigation action applied to the resolution. For example, a resolution of domain names with a risk score higher than the risk score threshold value may be logged and blocked/redirected. The request may also include customer equipment communicating with the IP network 202 to utilize the secure DNS infrastructure of the IP network 202.

During use, the IP network 202 secure DNS infrastructure may obtain security information for inclusion in the threat intelligence data. For example, one or more domain names may be identified as a high security risk based on feedback or analysis of data processed by the DNS infrastructure. Further, the DNS infrastructure may utilize this and all other aspects of the threat intelligence information when processing DNS requests from the enterprise. For example, in operation 906 the DNS infrastructure may receive a DNS request from the enterprise customer end user device. The DNS request may be received at the secure DNS resolver based on one or more enterprise corporate administration settings. The enterprise end user is generally associated with the enterprise customer profile (e.g. based on the IP address where the domain request came from) and the security policy is applied.

In one example, the secure DNS resolver may compare the domain name of the request to the threat intelligence data to determine if the domain name exceeds a risk threshold score. More particularly, the secure DNS resolver may associated with a security policy that includes a risk score for one or more domain names based on the threat intelligence data, as discussed above. For example, a domain name may be flagged as a high risk based on the received threat intelligence data and a corresponding risk score may be associated with the domain name. The security policy for the secure DNS resolver may define a risk score threshold value for known domain names and actions to take based on a risk score associated with a resolved domain name. For example, the security policy may allow and log or allow and not log domain names with risk scores that do not exceed the policy risk score threshold value. Requested domain names that exceed the risk score threshold value of the security policy may trigger a mitigation action by the DNS resolver in operation 908. In one example, the mitigation action may include blocking access to the domain name and logging the failed access.

In operation 910 and based on the security policy of the secure DNS service, security log information of the enterprise DNS activity may be received. For example, a security action under the particular security policy may including logging of DNS activity by the enterprise customer. The collected log information for the enterprise customer and/or other customers of the IP network 202 may used for real time alerting and custom reporting, either back to the enterprise customer or to aspects of the IP network 202. In one instance, an enterprise security administrator may link the real time alerting of the security control based action to a Security Orchestration Automation and Response (SOAR) tool to automatically take additional actions, such as isolate impacted device, open tickets to clean up one or more affected enterprise devices, create policies to block domain in the email security defenses, and/or web filtering defenses.

Figure 10:
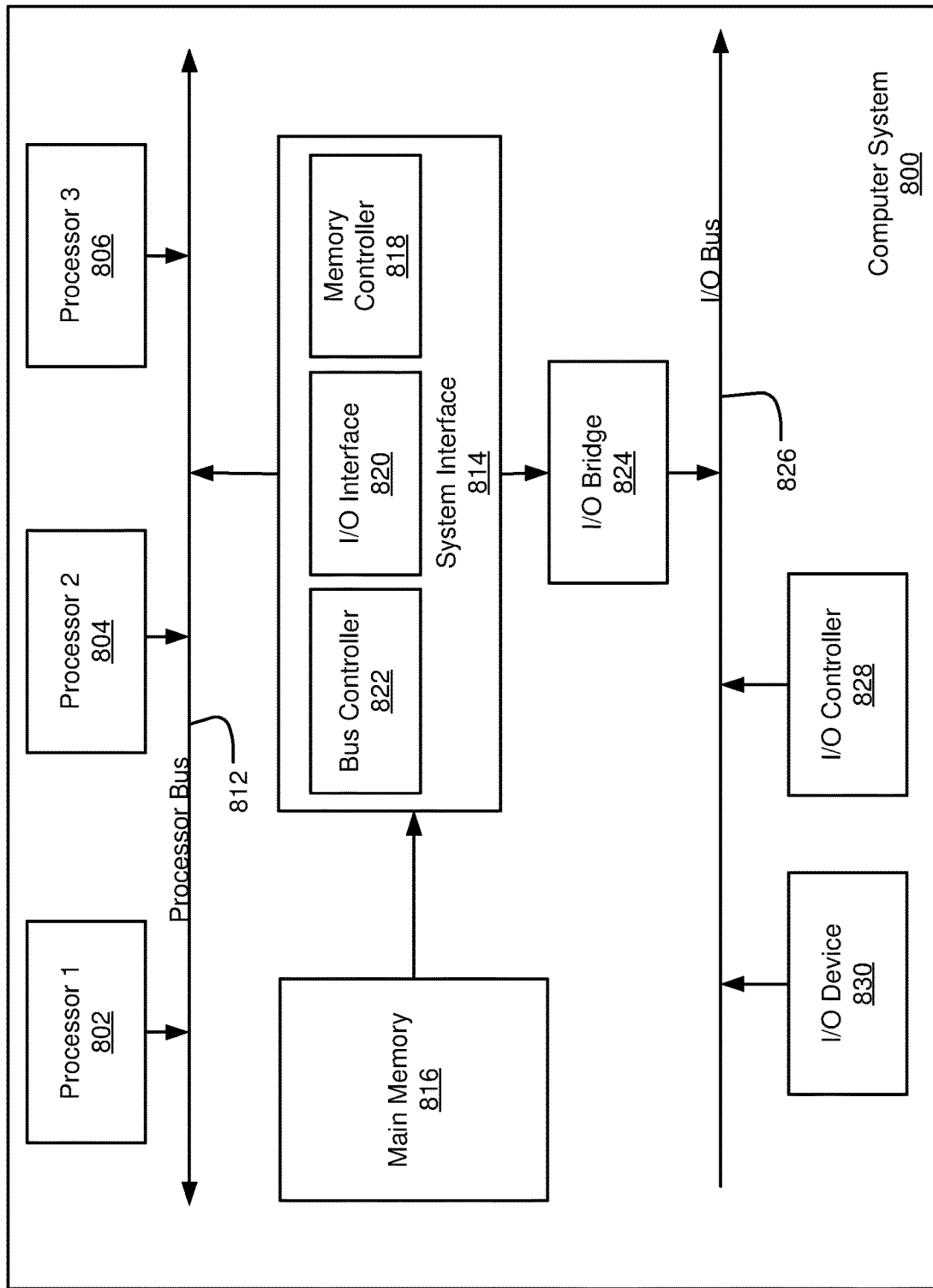
FIG. 10 is a diagram illustrating an example of a computing system which may be used in implementing embodiments of the present disclosure.

FIG. 10 is a block diagram illustrating an example of a computing device or computer system 1000 which may be used in implementing the embodiments of the components of the network disclosed above. For example, the computing system 1000 of FIG. 10 may be the security management system 218 discussed above. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other components of the system 1000 with the processor bus 1012. For example, system interface 1014 may include a memory controller 1014 for interfacing a main memory 1016 with the processor bus 1012. The main memory 1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other computer-readable devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 1016, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or software utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for providing security services from a telecommunications network, the method comprising:
   generating, at a computing device, a security infrastructure profile comprising a first network security device of a first network and a second network security device of a second network;
   receiving, at the computing device, threat intelligence data comprising identification of a source computing device associated with a network threat and a risk score associated with communications originating from the source computing device;
   receiving, from the first network security device and at the computing device, an event log associated with operation of the first network security device; and
   identifying, based on a comparison of the event log and the threat intelligence data at the computing device, an alteration configuration of the first network security device comprising installing a security rule associated with a first event of the event log;
   transmitting, based on a comparison of the risk score of the threat intelligence data to a risk threshold value of a security trigger, information to configure the first network security device of the first network and the second network security device of the second network to apply a security policy to communications originating from the source computing device associated with the network threat that includes the alteration configuration;
   providing, via a user interface, an interactive alert associated with the comparison of the risk score of the data to the risk threshold value of the security trigger; and
   receiving, via the user interface, an authorization to transmit the information to configure the first network security device of the first network and the second network security device of the second network, wherein
   the interactive alert includes a prompt in the user interface to submit the authorization.

2. The method of claim 1, further comprising:
   identifying a first plurality of network security devices of the first network and a second plurality of network security devices of the second network for inclusion in a security sub-system of security infrastructure profile; and configuring the security sub-system based on the threat intelligence data.

3. The method of claim 2 wherein the identifying of the first plurality of network security devices and the second plurality of network security devices in the security sub-system is based on a geographic location of the first plurality of network security devices and the second plurality of network security devices.

4. The method of claim 2 wherein the identifying of the first plurality of network security devices and the second plurality of network security devices in the security sub-system is based on a type of network security device of the first plurality of network security devices and the second plurality of network security devices.

5. The method of claim 2 wherein the security trigger is associated with the security sub-system of the security infrastructure profile.

6. The method of claim 4 wherein altering the configuration of the first network security device is based a source identification associated with the first event matching the identification of the source computing device associated with the network threat.

7. A network device comprising:
a processing device;
a communication port receiving threat intelligence data comprising identification of a source computing device associated with a threat to a network and a risk score associated with communications originating from the source computing device; and
a non-transitory computer-readable medium encoded with instructions, when executed by the processing device, cause the processing device to perform the operations of:
generating a security infrastructure profile comprising a first network security device of a first network and a second network security device of a second network;
receiving, from the first network security device, an event log associated with operation of the first network security device; and
identifying, based on a comparison of the event log and the threat intelligence data, an alteration configuration of the first network security device comprising installing a security rule associated with a first event of the event log;
transmitting, based on a comparison of the risk score of the threat intelligence data to a risk threshold value of a security trigger of a security policy for the first network security device, information to configure the first network security device of the first network and the second network security device of the second network to apply a security action on communications originating from the source computing device associated with the threat to the network that includes the alteration configuration;
transmitting, via the communication port, an interactive alert associated with the comparison of the risk score of the data to the risk threshold value of the security trigger; and
receiving, based on the interactive alert, an authorization to transmit the information to configure the first network security device of the first network and the second network security device of the second network, wherein the interactive alert includes a prompt in a user interface to submit the authorization.

8. The network device of claim 7 wherein the instructions further cause the processing device to perform the operations of:
identifying a first plurality of network security devices of the first network and a second plurality of network security devices of the second network for inclusion in a security sub-system of security infrastructure profile; and
configuring the security sub-system based on the threat intelligence data.

9. The network device of claim 8 wherein the identifying of the first plurality of network security devices and the second plurality of network security devices in the security sub-system is based on a geographic location of the first plurality of network security devices and the second plurality of network security devices.

10. The network device of claim 8 wherein the identifying of the first plurality of network security devices and the second plurality of network security devices in the security sub-system is based on a type of network security device of the first plurality of network security devices and the second plurality of network security devices.

11. The network device of claim 8 wherein the security trigger is associated with the security sub-system of the security infrastructure profile.

12. A network security system comprising:
a first plurality of network security devices of the first network and a second plurality of network security devices of the second network; and
a network security management device in communication with the first plurality of network security devices of the first network and a second plurality of network security devices of the second network, the network security management device comprising:
a processing device; and
a non-transitory computer-readable medium encoded with instructions, when executed by the processing device, cause the processing device to perform the operations of:
associating a security policy with a security infrastructure profile comprising the first plurality of network security devices of the first network and a second plurality of network security devices of the second network, the security policy comprising a security trigger parameter;
receiving threat intelligence data comprising identification of a source computing device associated with a network threat and a risk score associated with communications originating from the source computing device;
receiving, from the first network security device, an event log associated with operation of the first network security device; and
identifying, based on a comparison of the event log and the threat intelligence data, an alteration configuration of the first network security device comprising installing a security rule associated with a first event of the event log;
transmitting, based on a comparison of the risk score of the threat intelligence data to a risk threshold value of the security trigger parameter, information to configure at least a first network security device of the first network to apply a security action on communications originating from the source computing device associated with the threat to the network that includes the alteration configuration;

transmitting an interactive alert associated with the comparison of the risk score of the data to the risk threshold value of the security trigger; and receiving, based on the interactive alert, an authorization to transmit the information to configure the first network security device of the first network and the second network security device of the second network, wherein the interactive alert includes a prompt in a user interface to submit the authorization.

13. The network system of claim 12 wherein the instructions further cause the processing device to perform the operations of:

identifying a security sub-system of security infrastructure profile, the security sub-system comprising a subset of the first plurality of network security devices and a subset of the second plurality of network security devices.

14. The network system of claim 13 wherein the identifying of the subset of the first plurality of network security devices and the subset of the second plurality of network security devices in the security sub-system is based on a geographic location of the subset of the first plurality of network security devices and the subset of the second plurality of network security devices.

15. The network system of claim 13 wherein the identifying of the subset of the first plurality of network security devices and the subset of the second plurality of network security devices in the security sub-system is based on a type of network security device of the first plurality of network security devices and the second plurality of network security devices.

* * * * *